(12) United States Patent
Murakami et al.

(10) Patent No.: US 7,327,586 B2
(45) Date of Patent: Feb. 5, 2008

(54) POWER SUPPLY UNIT AND LIGHTING DEVICE FOR VEHICLE

(75) Inventors: Kentarou Murakami, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 384 days.

(21) Appl. No.: 11/040,365

(22) Filed: Jan. 21, 2005

(65) Prior Publication Data

US 2005/0184588 A1   Aug. 25, 2005

(30) Foreign Application Priority Data

Jan. 22, 2004  (JP)  .............................. 2004-014935
Jun. 2, 2004    (JP)  .............................. 2004-164964

(51) Int. Cl.
  *H02M 3/335*  (2006.01)
  *H05B 37/00*  (2006.01)
  *B60L 1/14*   (2006.01)

(52) U.S. Cl. ............................... 363/21.01; 363/21.09; 315/192

(58) Field of Classification Search ................. 363/16, 363/20, 21.01, 21.04, 21.07, 21.09, 56.01, 363/56.09, 56.1, 56.11; 307/9.1, 10.1, 10.8, 307/12, 17, 31–35; 315/185 R, 192, 201, 315/210, 228, 291, 294, 312, 186
See application file for complete search history.

(56) References Cited

U.S. PATENT DOCUMENTS 5,363,323 A * 11/1994 Lange .................... 363/21.09

5,736,881 A * 4/1998 Ortiz ...................... 327/175
6,369,525 B1 * 4/2002 Chang et al. ............. 315/300
6,434,027 B1 * 8/2002 Sano et al. .............. 363/21.16
6,493,243 B1 * 12/2002 Real ........................ 363/17

FOREIGN PATENT DOCUMENTS

| EP | 0 576 706 A1 | 1/1994 |
|---|---|---|
| JP | 55-144774 | 11/1980 |
| JP | 0 139 870 | 5/1985 |
| JP | 61-266068 | 11/1986 |
| JP | 11-68161 | 3/1999 |
| JP | 2000-50631 | 2/2000 |
| JP | 2002-231013 | 8/2002 |
| JP | 2003-187614 | 7/2003 |
| JP | 2003-317978 | 11/2003 |

OTHER PUBLICATIONS

Patent Abstracts of Japan, Publication No. 2002-231013, Publication Date Aug. 16, 2002, 2 pages.
Patent Abstracts of Japan, Publication No. 2003-317978, Publication Date Nov. 7, 2003, 2 pages.

(Continued)

*Primary Examiner*—Matthew V. Nguyen
(74) *Attorney, Agent, or Firm*—Osha Liang LLP

(57) ABSTRACT

A power supply unit comprises: a voltage output section for supplying a voltage to a plurality of loads connected in parallel with each other; and a plurality of output side coils provided respectively corresponding to the plurality of loads, the plurality of output side coils being trans-connected with each other, the plurality of output side coils being connected with the corresponding loads in series. An electric current to be supplied from the voltage output section to the corresponding load flow in each output side coil.

19 Claims, 7 Drawing Sheets

OTHER PUBLICATIONS

Patent Abstracts of Japan, Publication No. 2003-187614, Publication Date Jul. 4, 2003, 2 pages.
Patent Abstracts of Japan, Publication No. 61-266068, Publication Date: Nov. 25, 1986, 1 page.
Patent Abstracts of Japan, Publication No. 55-144774, Publication Date: Nov. 11, 1980, 1 page.
German Office Action issued in German Application No. 10 2005 003 021.1-32 mailed on Oct. 23, 2006 and English translation thereof, 7 pages.
Chinese Examination Report issued in Chinese Application No. 200410078149.8 issued on May 11, 2007 and English translation thereof, 9 pages.

* cited by examiner

POWER SUPPLY UNIT AND LIGHTING DEVICE FOR VEHICLE

This application claims foreign priorities based on Japanese patent applications JP2004-14935, filed on Jan. 22, 2004 and JP 2004-164964, filed on Jun. 2, 2004, the contents of which are incorporated herein by reference in its entirety.

BACKGROUND OF THE INVENTION

1. Field of the Invention

The present invention relates to a power supply unit and a lighting device for a vehicle.

2. Description of the Related Art

In a related art, a lighting device for a vehicle uses a light emitting diode element (for example, refer to JP-A-2002-231013). When the light emitting diode element is lit, a forward voltage is generated at both ends of the light emitting diode element according to a predetermined threshold voltage.

The forward voltage generated in the light emitting diode element greatly fluctuates for each individual body. Therefore, in the lighting device for the vehicle, in order to cope with the fluctuation of the forward voltage, the light emitting diode element is lit by controlling an electric current. However, from the viewpoint of designing a luminous intensity distribution, in some cases, the lighting device for the vehicle uses a plurality of light emitting diode elements, which are connected in parallel with each other. In this case, when an electric current supplied to each row of the light emitting diode elements, which are connected in parallel with each other, is set by an individual circuit, the circuit scale is increased. Further, the manufacturing cost of the lighting device for the vehicle is increased.

SUMMARY OF THE INVENTION

It is an object of the present invention to provide a power supply unit and a lighting device for a vehicle by which the above problems can be solved.

While the foregoing object is provided for the present invention, it is not necessary for the object to be achieved in order for the invention to operate properly. Further, other object, or no objects at all, may be achieved by the present invention without affecting its operation.

In order to solve the above problems, in the first aspect of the present invention, a power supply unit comprises: a voltage output section for supplying a voltage to a plurality of loads connected in parallel with each other; and a plurality of output side coils provided respectively corresponding to the plurality of loads, the plurality of output side coils being trans-connected with each other, the plurality of output side coils being connected with the corresponding loads in series, wherein an electric current to be supplied from the voltage output section to the corresponding load flows in each output side coil.

A power supply unit may further comprises: a voltage rise detecting section for detecting that a rise in voltage at a node between the load and the output side coil corresponding to the load becomes higher than a predetermined value; and an output control section for stopping an output of voltage from the voltage output section with respect to a lad at least the rise of the node voltage of which is detected in the case where the rise in the node voltage of the load is detected by the voltage rise detecting section.

The output side coils may generate magnetic fluxes, the directions of which are canceled to each other, according to the electric currents respectively supplied to the loads from the voltage output section.

The voltage output section has a transformer for the power supply unit including a primary coil and a plurality of secondary coils provided corresponding to the plurality of loads, and the plurality of secondary coils are respectively connected with the corresponding loads and the output side coils corresponding to the loads in series.

A power supply unit may further comprises: a plurality of series resistors respectively arranged corresponding to the loads and respectively connected with the corresponding loads and also connected with the output side coils corresponding to the loads in series; and an output control section for controlling an output voltage of the voltage output section so that voltages generated at both ends of the respective series resistors can be equal to the setting voltage commonly determined for the plurality of series resistors.

The plurality of output side coils may be formed so that the winding wires can be separate from each other. A power supply unit may further comprises a semiconductor element for supplying an electric current according to a leakage inductance of the output side coil to the load in the case where an electric current supplied from the voltage output section to the load is reduced.

The voltage output section may supply the voltage to N pieces of loads (N is an integer not less than 2.) from the first to the N-th which are connected in parallel with each other, and the power supply unit includes (N−1) pieces of output side transformers from the first to the (N−1)-th provided between the voltage output section and the load, and the k-th output side transformer (k is an integer satisfying the inequality $1 \leq k \leq N-1$.) includes the output side coil connected with the k-th load in series and also includes (N−k) pieces of output side coils respectively connected with the (k+1) to the N-th load in series and generating a magnetic flux in the direction to cancel the magnetic flux generated by the output side coil connected with the k-th load in series according to the electric current supplied from the voltage output section.

The plurality of loads are light sources respectively having a semiconductor light emitting element connected to the corresponding output side coils in series.

In the second aspect of the present invention, a lighting device for a vehicle comprises: a plurality of light source sections connected in parallel with each other; a voltage output section for supplying a voltage to the plurality of light source sections; and a plurality of output side coils respectively arranged corresponding to the plurality of light source sections, the plurality of output side coils being a plurality of output side coils trans-connected with each other, the plurality of output side coils being connected with the corresponding light source sections in series, wherein an electric current to be supplied from the voltage output section to the corresponding light source section flow in each output side coil.

In this connection, the summary of the invention described above does not enumerate all characteristics necessary for the present invention. The sub-combination of these characteristics can become the present invention.

DETAILED DESCRIPTION OF THE INVENTION

Hereinafter, exemplary, non-limiting embodiments of the invention will be explained with reference to the accompanying drawings. In the present invention, terms are presumed to have their ordinary meaning as would be understood by one of ordinary skill in the relevant art. However, terms may also be operationally defined in this disclosure to have a specific meaning. Further, it should be noted that the following embodiments do not restrict the invention described in claim. It should be also noted that all combinations of the characteristics explained in the embodiments are not necessarily indispensable to the means for the solution of the invention.

Figure 1:
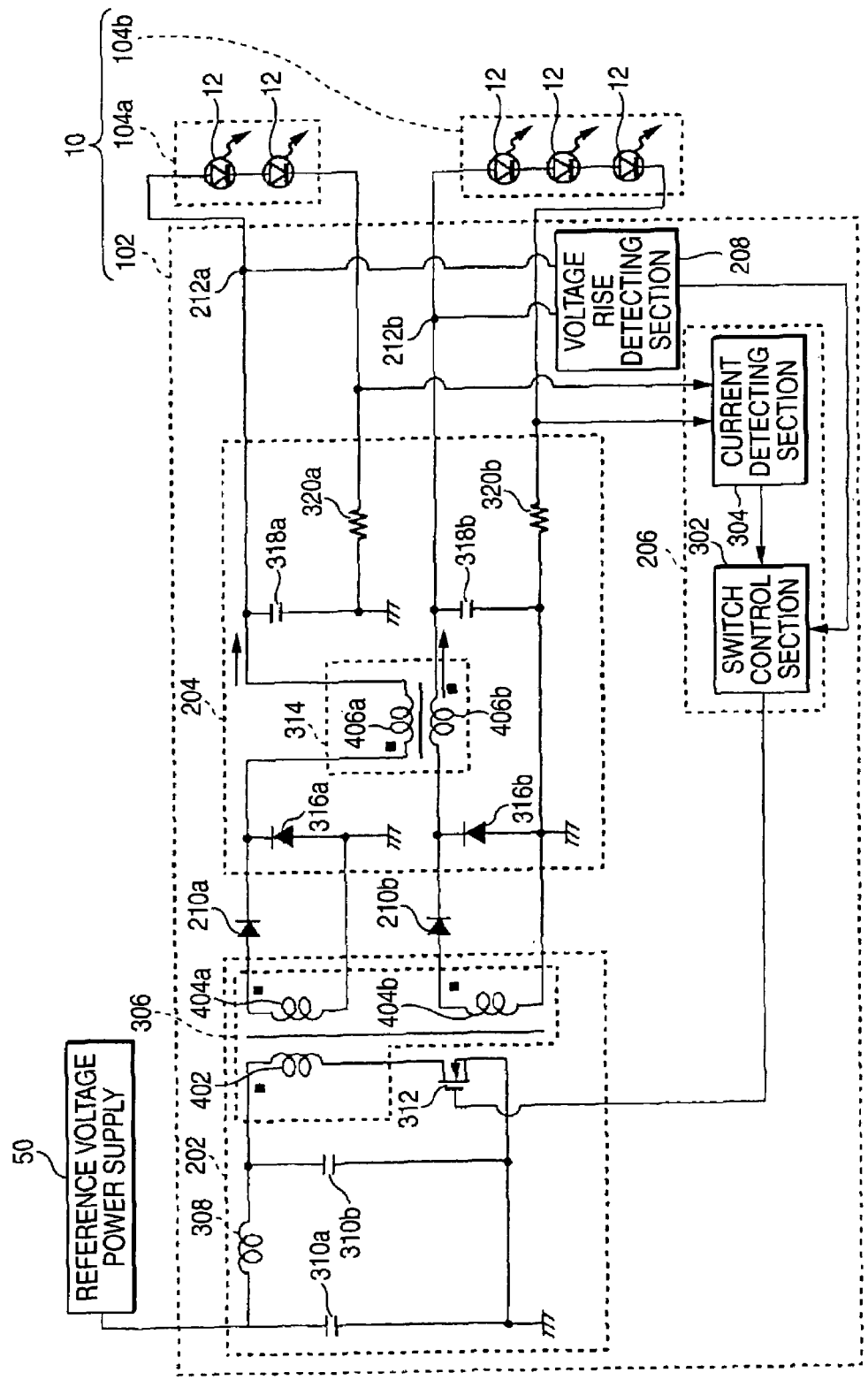
FIG. 1 is a view showing the constitution of a lighting device 10 for a vehicle according to an exemplary, non-limiting embodiment of the present invention together with a reference voltage power supply 50.

FIG. 1 is a view showing the constitution of the lighting device 10 for the vehicle of the present invention according to an exemplary, non-limiting embodiment of the present invention. In FIG. 1, the lighting device 10 for the vehicle is shown together with a reference voltage power supply 50. The reference voltage power supply 50 is, for example, a battery mounted on the vehicle. The reference voltage power supply 50 supplies a DC voltage to a power supply unit 102. The lighting device 10 for the vehicle of the embodiment includes a plurality of light source sections 104*a*, 104*b* and the power supply unit 102. The lighting device 10 for the vehicle of the embodiment properly lights the plurality of light source sections 104*a*, 104*b*.

The plurality of light source sections 104*a*, 104*b* are an example of the load connected to the power supply unit 102. The plurality of light source sections 104*a*, 104*b* are connected in parallel with each other and respectively provided with one or more light emitting diode elements 12. The light emitting diode element 12 is an example of the semiconductor light emitting element and emits light according to electric power supplied from the power supply unit.

The light source sections 104*a*, 104*b* may respectively have light emitting diode elements 12, the numbers of which are different from each other. The light source sections 104*a*, 104*b* may have a plurality of light source rows connected in parallel with each other. In this case, the light source row is defined as a row of the one or more light emitting diode elements 12, connected in series to each other.

The power supply unit 102 includes: a voltage output section 202; a plurality of output current supply sections 210*a*, 210*b*; a current ratio setting section 204; a voltage rise detecting section 208; and an output control section 206. The voltage output section 202 includes: a coil 308; a plurality of condensers 310*a*, 310*b*; a switching element 312; and a transformer 306 for the power supply unit.

The coil 308 is connected to the primary coil 402 of the transformer 306 for the power supply unit in series and supplies an output voltage of the reference voltage power supply 50 to the transformer 306 for the power supply unit. The condensers 310*a*, 310*b* smoothen a voltage generated at both ends of the coil 308. The switching element 312 is connected to the primary coil 402 of the transformer 306 for the power supply unit in series. When the switching element 312 is turned on and off being controlled by the output control section 206, an electric current flowing in the primary coil 402 can be intermittently changed.

The transformer 306 for the power supply unit includes: a primary coil 402; and a plurality of secondary coils 404*a*, 404*b*. In the case where the switching element 312 is turned on, an electric current, which has been received from the reference voltage power supply 50 through the coil 308, flows in the primary coil 402. A plurality of secondary coils 404*a*, 404*b* are provided corresponding to the plurality of light source sections 104*a*, 104*b*. The plurality of secondary coils 404*a*, 404*b* supply a voltage, which is generated according to the electric current flowing in the primary coil 4029 to the corresponding light source section 104 via the output current supply section 210 and the current ratio setting section 204. Thus, the voltage output section 202 supplies a voltage to the plurality of light source sections 104*a*, 104*b*. The plurality of secondary coils 404*a*, 404*b* may have the numbers of turns which are different from each other. In this case, the secondary coils 404*a*, 404*b* respectively output a different voltage generated according to the number of turns.

The plurality of output current supply sections 210*a*, 210*b* are diodes provided corresponding to the plurality of secondary coils 404*a*, 404*b*. The plurality of output current supply sections 210*a*, 210*b* are connected in the forward direction between the secondary coil 404 and the current ratio setting section 204. Thus, the output current supply section 210 supplies a voltage outputted from the corresponding secondary coil 404 to the light source section 104 via the current ratio setting section 204.

The current ration setting section 204 includes: a plurality of condensers 318*a*, 318*b*; a plurality of series resistors 320*a*, 320*b*; an output side transformer 314; and a plurality of leakage inductance current supply sections 316*a*, 316*b*. The plurality of condensers 318*a*, 318*b* and the plurality of series resistors 320*a*, 320*b* are provided corresponding to the plurality of light source sections 104*a*, 104*b*. The condenser 318 smoothens an electric current flowing in the corresponding light source section 104. The series resistor 320 is connected to the corresponding light source section 104 in series. Therefore, a voltage corresponding to the electric current flowing in the corresponding light source section 104 is generated at both ends.

The output side transformer 314 includes a plurality of output side coils 406*a*, 406*b*. The plurality of output side coils 406, 406*b* are respectively provided corresponding to the plurality of light source sections 104*a*, 104*b*. The output side coil 406 is connected to the corresponding light source section 104 in series. An electric current to be supplied from the voltage output section 202 to the light source section 104 flows in the output side coil 406. In each light source section 104, the light emitting diode element 12 is connected to the corresponding output side coil 406 in series.

In the embodiment, the winding direction of the output side coil 406a and that of the output side coil 406b are opposite to each other. Therefore, the plurality of output side coils 406a, 406b respectively generate magnetic fluxes, which cancel to each other, according to the electric currents supplied to the light source sections 104 from the voltage output section 202. The plurality of output side coils 406a, 406b are trans-connected to each other. Therefore, in the plurality of output side coils 406a, 406b, the electric currents, the intensities of which are the reciprocal ratio of the number of turns, flow.

The plurality of leakage inductance current supply sections 316a, 316b are diodes provided corresponding to the plurality of output side coils 406a, 406b. This diode is an example of the semiconductor element. The anode of the leakage inductance current supply section 316 is connected to a low potential side output of the secondary coil 404. The leakage inductance current supply section 316 is connected in the reverse direction between the cathode of the diode composing the output current supply section 210 and the low potential side output of the secondary coil 404.

In this case, the leakage inductance current supply section 316 emits energy, which has been accumulated in the leakage inductance of the corresponding output side coil 406, to the condenser 318 via the corresponding output side coil 406. Thus, for example, when an intensity of the electric current supplied from the voltage output section 202 to the light source section 104 is reduced, the leakage inductance current supply section 316 supplies an electric current corresponding to the leakage in of the corresponding output side coil 406 to the light source section 104. In this case, the electric current corresponding to the leakage inductance is, for example, an electric current generated according to the emission of energy accumulated in the leakage inductance.

In the embodiment, the leakage inductance current supply section 316 composes a forward converter together with the transformer 306 for the power supply unit, the switching element 312, the output current supply section 210 and the output side coil 406. The leakage inductance current supply section 316 emits energy, which has been accumulated in the leakage inductance of the output side coil 406 in the period in which the switching element 312 is turned on, to the condenser 318 in the period in which the switching element 312 is turned off.

If the leakage inductance current supply section 316 is not used in this case, energy accumulated in the leakage inductance becomes a loss in the period in which the switching element 312 is turned off. However, according to the embodiment, energy accumulated in the leakage inductance can be effectively given to the light source section 104.

The voltage rise detecting section 208 detects a rise in the voltage supplied to each light source section 104a, 104b. This voltage is a voltage at the node 212a, 212b between the light source section 104a, 104b and the output side coil 406a, 406b corresponding to the light source section 104a, 104b. For example, this voltage is an absolute value of the potential difference between the potential of the node 212 and the ground potential. The voltage rise detecting section 208 detects that the voltage of the node 212 rises higher than a predetermined value with respect to the respective light source section 104. The voltage rise detecting section 208 may detect a rise of the absolute value of the node 212.

The output control section 206 includes: a current detecting section 304; and a switch control section 302. When the current detecting section 304 detects a voltage generated between both ends of the series resistor 320, an electric current flowing in the light source section 104 corresponding to the series resistor 320 can be detected.

The switch control section 302 controls the time at which the switching element 312 is turned on and off, for example, by the well known PWM control or PFM control according to the electric current detected by the current detecting section 304. Thus, the switch control section 302 controls the switching element 312 so that an electric current detected by the current detecting section 304 can be constant.

In the case where the voltage rise detecting section 208 detects a rise of the voltage of the node 212a, 21b with respect to any light source section 104a, 104b, the switch control section 302 maintains the switching element 312 to be turned off and stops an output of the voltage from the voltage output section 202. Thus, it is possible for the output control section 206 to provide a fail-safe function by which operation of the power supply unit 102 is stopped in the case of emergency.

In another embodiment, the switch control section 302 may selectively stop an output of the voltage from the voltage output section 202 with respect to the light source section 104 in which a rise of the voltage of the node 212 has been detected. In this case, the light source section 104, in which no problems occur, can be continuously turned on. Thus, it is possible to provide a lighting device 10 for a vehicle, the lengthiness with respect to failure of which is high.

However, in the lighting device 10 for the vehicle, from the viewpoint of designing a luminous intensity distribution, a plurality of light source sections 104a, 104b, the necessary voltage values and current values of which are different from each other, are used in some cases. In this case, for example, when the individual power supply units 102 are provided for the light source sections 104, the manufacturing cost is increased. However, according to the embodiment, in one power supply unit 102, when the individual secondary coils 404a, 404b are provided for the plurality of light source sections 104a, 104b, the respective light source sections 104 can be individually supplied with an appropriate voltage. Further, when the output side transformer 314 having a plurality of output side coils 406a, 406b is used, an electric current ratio of the electric currents supplied to the respective light source sections 104a, 104b can be appropriately set. Therefore, according to the embodiment, a plurality of light source sections 104 can be appropriately lit at a low manufacturing cost. Thus, the lighting device for the vehicle can be provided at a low manufacturing cost.

Alternatively, the transformer 306 for the power supply unit may have one secondary coil 404. In this case, an electric current outputted from the common secondary coil 404 is divided by the current ratio determined by the respective numbers of turns so that the divided currents can be given to the plurality of output side coils 406a, 406b. The power supply transformer 306 for the power supply unit may output either a positive voltage or a negative voltage.

Further, the output side coils 406a, 406b of the output side transformer 314 may be coils, the winding directions of which are the same. In this case, the plurality of output side coils 406a, 406b generate magnetic fluxes having directions in which both magnetic fluxes can be strengthened by each other. Each output side coil 406 generates a voltage corresponding to the ratio of the number of turns at both ends.

Therefore, it is preferable that the plurality of output side coils 406a, 406b have the number of turns of the ratio corresponding to the voltage to be supplied to th corresponding light source sections 104a, 104b.

Figure 2A:
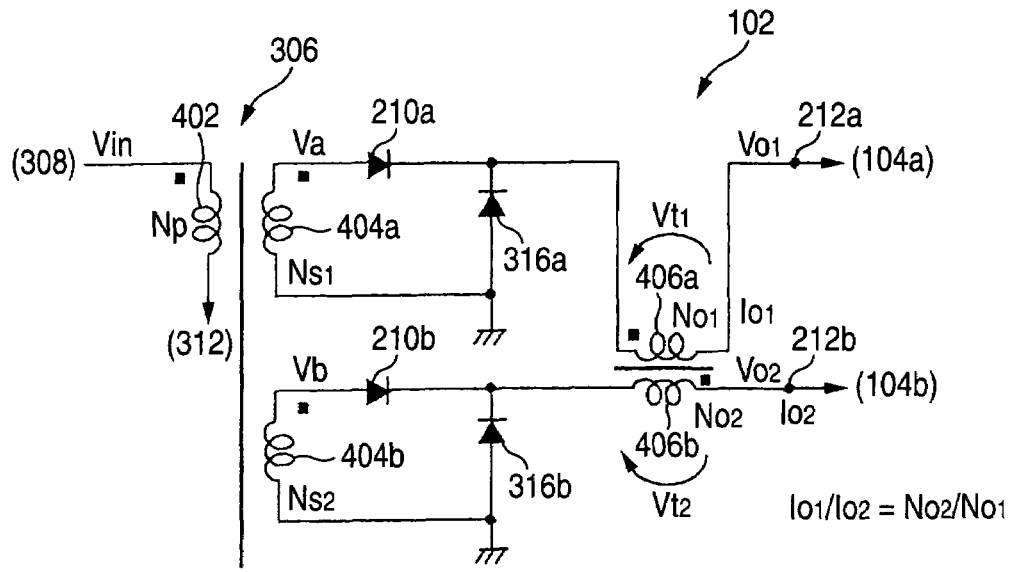
FIG. 2A is a view showing a power supply unit 102 in the case where the plurality of light source section 104*a*, 104*b* are in the normal state.
Figure 2B:
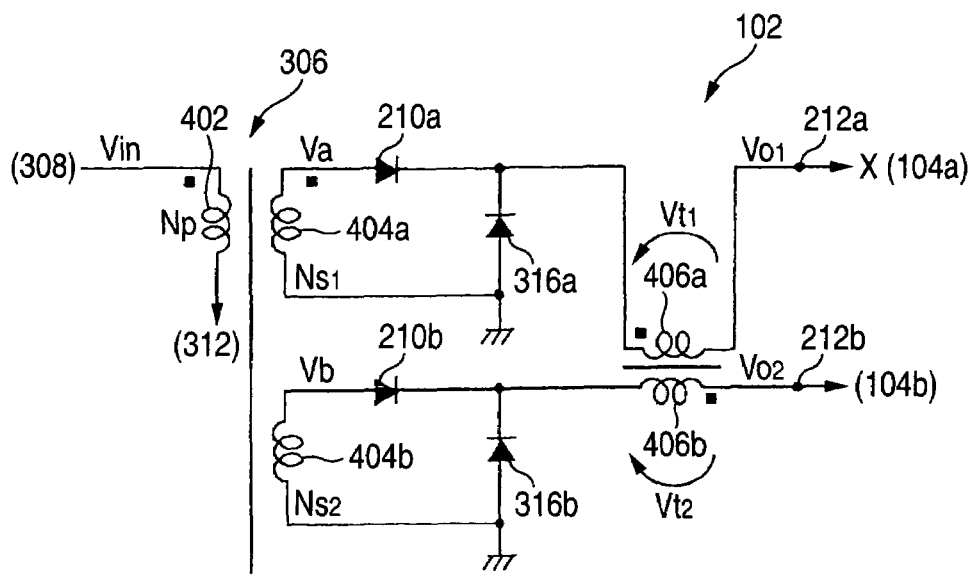
FIG. 2B is a view showing the power supply unit 102 in the case where one light source section 104*a* is put into the open state.

FIG. 2 is a view for explaining an example of the operation of the power supply unit 102. In this view, only a portion of the power supply unit 102 necessary for the explanations is illustrated. FIG. 2A is a view showing the power supply unit 102 in the case where the plurality of light source sections 104a, 104b are normal. FIG. 2B is a view showing the power supply unit 102 in the case where one light source sections 104a is in an open state. In this case, the open state is defined as a state in which the impedance between the node 212 and the ground potential is high, for example, due to the breaking of wire in the light source section 104.

In the embodiment, the number of turns of the primary coil 402 is $N_p$, the numbers of turns of the secondary coils 404a, 404b are $N_s1$ and $N_s2$, and the numbers of turns of the output side coils 406a, 406b are $N_o1$ and $N_o2$. The plurality of secondary coils 404a, 404b are respectively connected in series to the corresponding light source section 104 and the output side coil 406 corresponding to the light source section 104.

The primary coil 402 receives a predetermined voltage $V_{in}$ from the reference voltage power supply 50 (shown in FIG. 1) via the coil 308. In this case, the secondary coil 404a outputs a terminal voltage $V_a$ obtained by the expression $V_a=V_{in}\cdot N_s1/N_p$. The secondary coil 404b outputs the terminal voltage $V_b$ satisfying the expression $V_b=V_{in}\cdot N_s2/N_p$.

As shown in FIG. 2A, in the case where the plurality of light source sections 104a, 104b are normal, the electric current $I_o1$ and $I_o2$, which satisfy the expression $I_o1/I_o2=N_o2/N_o1$, flow in the respective output side coils 406a, 406b. Thus, the electric current ratio setting section 204 (shown in FIG. 1) sets ratios of the electric currents respectively flowing in the plurality of light source sections 104a, 104b.

In this case, the magnetic fluxes generated by the output side coils 406a, 406b are canceled to each other. Therefore, the inductance of the output side coils 406a, 406b becomes a minimum value substantially determined only by the leakage inductance. Therefore, in the case where the plurality of light source sections 104a, 104b are normal, the voltage $V_t1$, $V_t2$ generated at both ends of the output side coils 406a, 406b become minimum. The output side coils 406a, 406b output the voltage Vo1, Vo2, which are determined by the expressions $V_o1=V_a-V_t1$, $V_o2=V_b-V_t2$, to the nodes 212a, 212b.

On the other hand, in the case where one light source section 104a is in the open state as shown in FIG. 2B, the terminal voltage $V_a$, $V_b$ of the secondary coils 404a, 404b are determined by $V_{in}$ and the ratio of the number of turns in the transformer 306 for the power supply unit. Therefore, even when either light source section 104 is in the open state, the terminal voltage $V_a$, $V_b$ of the secondary coils 404a, 404b are not changed. However, in this case, the output side coil 406a corresponding to the light source section 104a, which is in the open state, accumulates energy according to the electric current flowing in the output side coil 406b. The output side coil 406b is the output side coil 406 corresponding to the light source section 104b which is not in the open state.

In this case, the voltage $V_t1$ satisfying the expression $V_t1=Vt2\cdot N_o1/N_o2$ is generated at both ends of the output side coil 406a. Thus, the output side coil 406a outputs the voltage $V_o1$ satisfying the expression $V_o1=V_a+V_t1=V_a+V_t2\cdot N_o1/N_o2$ to the node 212a. Therefore, the voltage of the node 212a corresponding to the light source section 104a, which is in the open state, rises higher than that in the case in which this light source section 104a is normal.

In this case, for example, even when the terminal voltage $V_a$, $V_b$ of the secondary coils 404a, 404b is detected, since the terminal voltage $V_a$, $V_b$ is not changed even in the case where any light source section 104 is in the open state, it is difficult to detect the open state of the light source section 104. However, in the embodiment, the voltage rise detecting section 208 (shown in FIG. 1) detects a rise in the voltage $V_o1$, $V_o2$ of the nodes 212a, 212a. In the case where the voltage rise detecting section 208 detects a rise in the voltage of any node 212, the switch control section 302 (shown in FIG. 1) stops the operation of the power supply unit 102. Therefore, according to the present embodiment, it is possible to properly detect that the light source section 104 is in the open state. Thus, the fail-safe control with respect to the open state of the light source section 104 can be properly conducted, and further the control of lengthiness of a plurality of light source sections 104 can be properly conducted.

Figure 3:
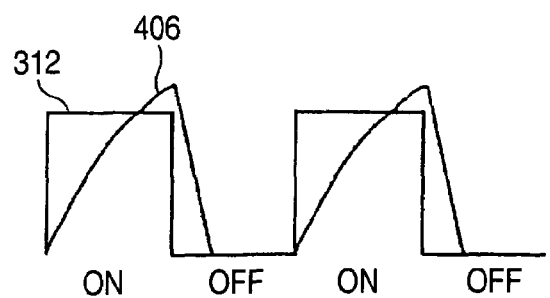
FIG. 3 is a view showing an example of the action of an output side coil 406.

FIG. 3 is a view for explaining an example of the operation of the output side coil 406. In the example, the switching element 312 is repeatedly turned on and off according to the control conducted by the switch control section 302. In this case, an electric current, the wave-shape of which is saw-toothed, flows in the output side coil 406 as shown in the drawing.

In the embodiment, the plurality of output side coils 406 generate magnetic fluxes, the directions of which cancel to each other. Therefore, the inductance of the respective output side coils 406 seldom contains a component except for the leakage inductance. Accordingly, the inductance of the respective output side coils 406 is minimized, and a change in the electric current of the output side coil 406 becomes maximum in the case where the switching element 312 is turned on or off.

According to the leakage inductance, the output side coil 406 accumulates energy in the period in which the switching element 312 is turned on. The output side coil 406 emits the thus accumulate energy in the period in which the switching element 312 is turned off. Therefore, when the leakage inductance of the output side coil 406 is extremely low, in the case where the switching element 312 is turned on, the electric current suddenly flows and the peak electric current is increased. In this case, for example, it becomes necessary to use a large-scale circuit element; and the manufacturing cost of the lighting device 10 for the vehicle is increased.

Therefore, in the output side transformer 314, it is preferable that the plurality of output side coils 406 are composed so that the winding wires can be separate from each other. In this case, the leakage inductance of the output side coils 406 is increased. Therefore, it is possible to suppress a sudden increase in the electric current flowing in the switching element 312.

In the embodiment, the energy of the leakage inductance is given back to the light source section 104 by the leakage inductance current supplying section 316. Therefore, according to the embodiment, when the existing leakage inductance of the output side coil 406 is utilized, while a sudden change in the electric current is being suppressed, the light source section 104 can be effectively lit.

Alternatively, the current ratio setting section 204 may include a coil exclusively used for suppressing a sudden change in the electric current. For example, this coil is connected in series to the output side coil 406 between the transformer 306 for the power supply unit and the output side coil 406. While the switching element 312 is being turned off, the leakage inductance current supplying section 316 supplies an electric current corresponding to the coil inductance to the light source section 104.

Figure 4:
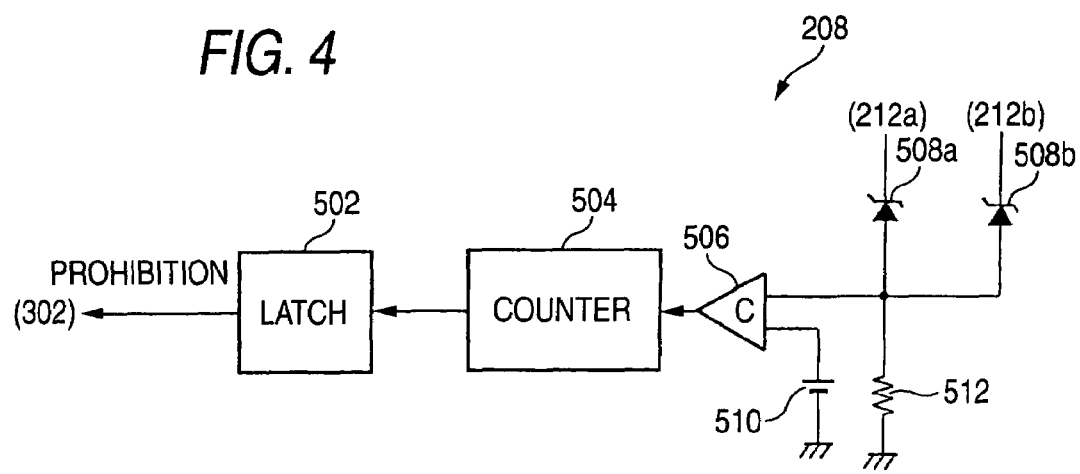
FIG. 4 is a view showing an example of the constitution of a voltage rise detecting section 208.

FIG. 4 is a view showing an example of the constitution of the voltage rise detecting section 208. In the example, the voltage rise detecting section 208 includes: a plurality of Zener diodes 508a, 508b; a comparator 506; a resistor 512; a constant voltage power supply 510; a counter 504; and a latch 502. The plurality of Zener diodes 508a, 508b are arranged corresponding to the plurality of light source sections 104a, 104b (shown in FIG. 1). The cathode of Zener diode 508 is connected to the node 212 relating to the corresponding light source section 104, and the anode of Zener diode 508 is connected to one input terminal of the comparator 506. In the comparator 506, the input terminal is connected to the ground via the resistor 512. Therefore, in the case where the voltage of the corresponding node 212 becomes higher than Zener diode voltage, Zener diode 508 gives this voltage of the node 212 to the comparator 506.

In the comparator 506, the other input terminal receives a voltage from the constant voltage power supply 510. The constant voltage power supply 510 gives a voltage lower than Zener voltage of Zener diode 508 to the comparator 506. Therefore, when the voltage of any node 212 becomes higher than Zener voltage of Zener diode 508, the comparator 506 inverts the output T it is possible to properly detect that the voltage of the node 212 is increased higher than a predetermined value.

The counter 504 delays an output of the comparator 506 and supplies it to the latch 502. The latch 502 latches the output of the counter 504, and the latched value is outputted to the switch control section 302. Thus, it is possible to properly discriminate an abnormality, in which the light source section 104 is put into the open state, from a rise in the voltage caused by a temporary voltage fluctuation caused by noise and others. Therefore, according to the present embodiment, a rise in the voltage of the node 212 can be properly detected. Thus, for example, the open state of the light source section 104 can be properly detected.

Alternatively, the voltage rise detecting section 208 may include a plurality of resistors instead of the plurality of Zener diodes 508a, 508b. These resistors are provided between the node 212 and the comparator 506 instead of Zener diode 508. In this case, a rise in the voltage of the node 212 can be properly detected.

Figure 5:
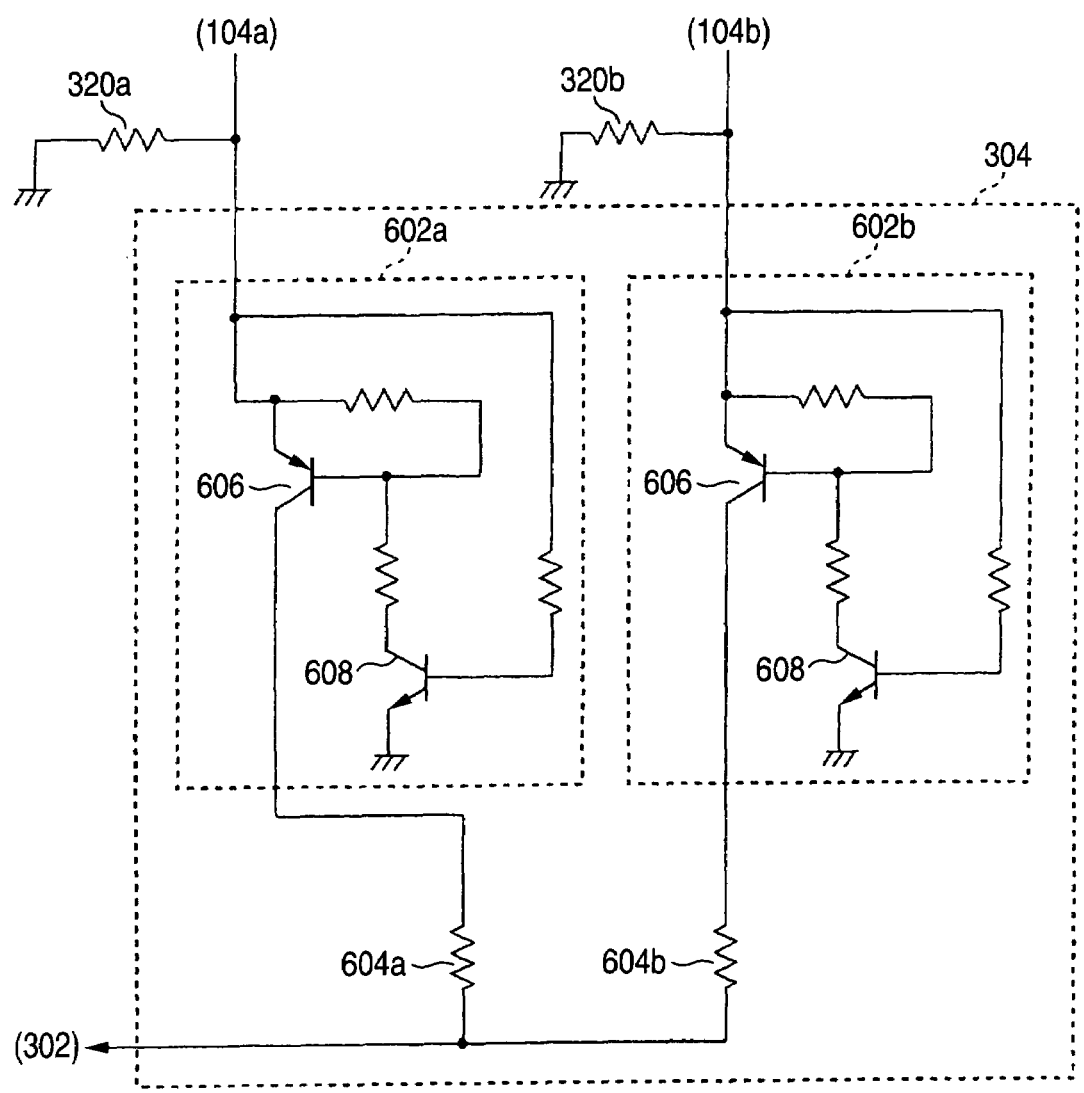
FIG. 5 is a view showing an example of the constitution of a current detecting section 304 together with a plurality of series resistors 320*a*, 320*b*.

FIG. 5 is a view showing an example of the constitution of the current detecting section 304. The current detecting section 304 is shown together with a plurality of series resistors 320a, 320b. In the example, the current detecting section 304 includes: a plurality of broken wire detecting sections 602a, 602b provided corresponding the plurality of light source sections 104a, 104b; and a plurality of resistors 604a, 604b.

The broken wire detecting section 602 includes: a PNP transistor 606; a NPN transistor 608; and a plurality of resistors. A base terminal of PNP transistor 606 is connected to its emitter terminal via a resistor. The emitter terminal is connected to the node provided between the corresponding light source section 104 and the series resistor 320. A collector terminal of PNP transistor 606 is connected to the corresponding resistor 604. A base terminal of NPN transistor 608 is connected to the node provided between the corresponding light source section 104 and the series resistor 320 via a resistor. A collector terminal of NPN transistor 608 is connected to the base terminal of PNP transistor 606 via a resistor. An emitter terminal of NPN transistor 608 is grounded. The resistor 604 connects the collector terminal of PNP transistor 606 in the broken wire detecting section 602 with the switch control section 302.

Therefore, in the case where the corresponding light source section 104 is not in the open state, the node potential between the light source section 104 and the series resistor 320 is the product of the value of the electric current flowing in the light source section 104 and the resistance value of the series resistor 320. In this case, the NPN transistor 608 and PNP transistor 606 are turned on, and the resistor 604 receives a voltage generated at both ends of the series resistor 320 from the broken wire detecting section 602.

In the case where the corresponding light source section 104 is in the open state due to the breaking of wire, since no electric current flows in the series resistor 320, the node potential between the light source section 104 and the series resistor 320 becomes the ground potential. In this case, the NPN transistor 608 and PNP transistor 606 are turned off, and the resistor 604 receives high impedance from the broken wire detecting section 602.

Thus, in the case where the light source sections 104a, 104b are not in the open state, the current detecting section 304 supplies an average value of the voltages generated between both ends of the series resistor 320a, 320b to the switch control section 302 so that it can be used as the detected electric current value. In the case where any light source section 104a, 104b is in the open state, the current detecting section 304 supplies a voltage generated between both ends of the series resistor 320a, 320b, which is not in the open state, to the switch control section 302 so that it can be used as the detected electric current value. The switch control section 302 controls the switching element 312 (shown in FIG. 1) so that a voltage received from the current detecting section 304 can be constant.

In this case, the series resistor 320 is connected in series to the light source section 104 and the output side coil 406 (shown in FIG. 1) corresponding to light source section 104. Therefore, in the case where the corresponding light source section 104 is not in the open state, an electric current, the current ratio of which is set by the output side coils 406a, 406b, flows in the plurality of series resistors 320a, 320b.

In the embodiment, the series resistors 320 respectively have a value of resistance which is determined by a reciprocal ratio with respect to the ratio of the :current flowing in the corresponding light source section 104. Accordingly, in the embodiment, the respective series resistors 320 generate the substantially same voltage corresponding to the electric current flowing in the corresponding light source section 104. Therefore, according to the embodiment, when an average value of the voltages generated at both ends of the series resistor 320 is controlled so that it can be the same as the setting voltage which is commonly determined with respect to the plurality of series resistors 320, the electric currents flowing in the plurality of light source sections 104a, 104b can be properly controlled. The output control section 206 (shown in FIG. 1) may control an output voltage of the voltage output section 202 so that a voltage generated at both ends of the respective series resistors 320 can be the same as the setting voltage.

When the lighting device 10 for the vehicle (shown in FIG. 1) has three or more light source sections 104 and any light source section 104 is in the open state, the current detecting section 304 may supply an average value of the voltages generated at both ends of the series resistor 320 corresponding to the light source section 104 which is not in the open state to the switch control section 302. Alternatively, the current detecting section 304 may supply the sum of the voltages generated at both ends of the respective series resistors 320 to the switch control section 302.

Here, it can be considered that a plurality of light source sections 104 are lit when a voltage supplied to the respective light source sections 104 is controlled. However, in this case, due to the fluctuation of the forward direction voltage of the light emitting diode element 12 (shown in FIG. 1), control may become complicated. However, according to the embodiment, when the electric current flowing in each light source section 104 is controlled, the plurality of light source sections 104 can be properly lit.

Figure 6:
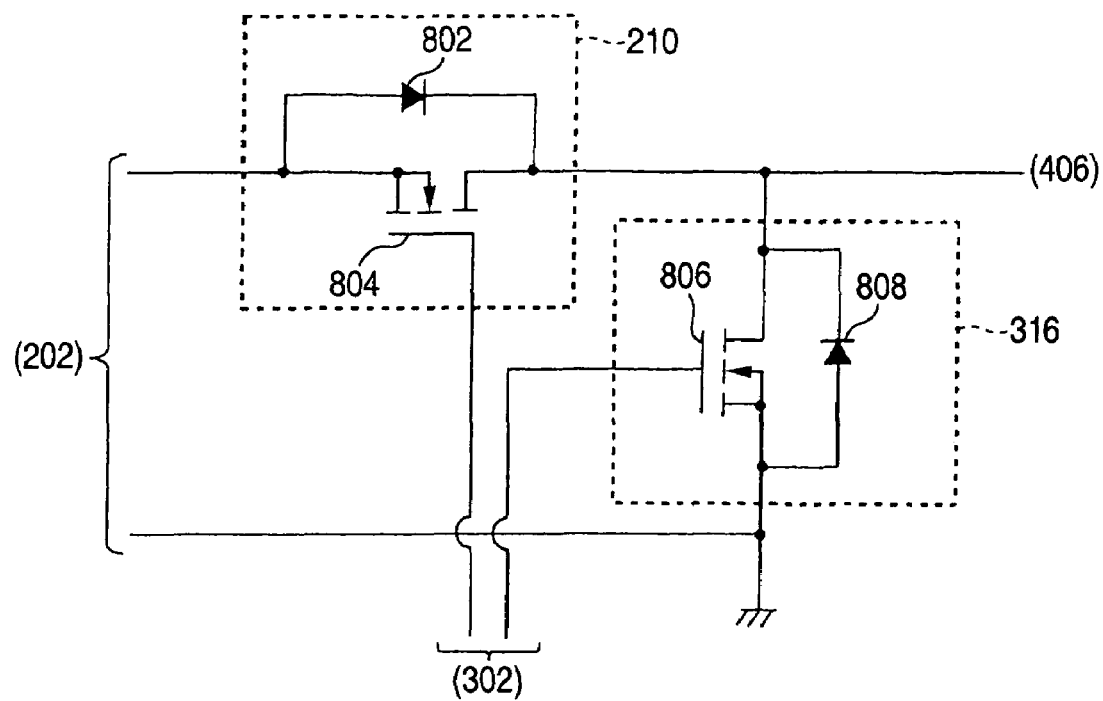
FIG. 6 is a view showing another example of the constitution of an output current supplying section 210 and a leakage inductance current supplying section 316.

FIG. 6 is a view showing another example of the constitution of the output current supplying section 210 and the leakage inductance current supplying section 316. In the example, the output current supplying section 210 includes a diode 802 and a NMOS transistor 804. The leakage inductance current supplying section 316 includes a diode 808 and a NMOS transistor 806. The diode 802, NMOS transistor 804, the diode 808 and NMOS transistor 806 are respectively an example of the semiconductor element. The diodes 802, 808 may be composed of a parasite diode of NMOS transistor.

The diode 802 and the diode 808 have the same functions as those of the output current supplying section 210 and the leakage inductance current supplying section 316 in FIG. 1. The NMOS transistor 804 and NMOS transistor 806 are turned on and off synchronously with the switching element 312 (shown in FIG. 1) according to the control conducted by the switch control section 302. In the example, the NMOS transistor 804 is turned on in the period in which the switching element 312 is turned on. The NMOS transistor 804 supplies an electric current to the output side coil 406 and the diode 802. The NMOS transistor 806 is turned on in the period in which the switching element 312 is turned off. NMOS transistor 806 supplies an electric current to the output side coil 406 and the diode 808. Thus, the NMOS transistor 804 and NMOS transistor 806 conduct a synchronous rectification together with the diode 802 and the diode 808. Therefore, for example, compared with a case in which a rectification is conducted only by the diode 802 and the diode 808, it is possible to reduce a loss of electric power.

Figure 7:
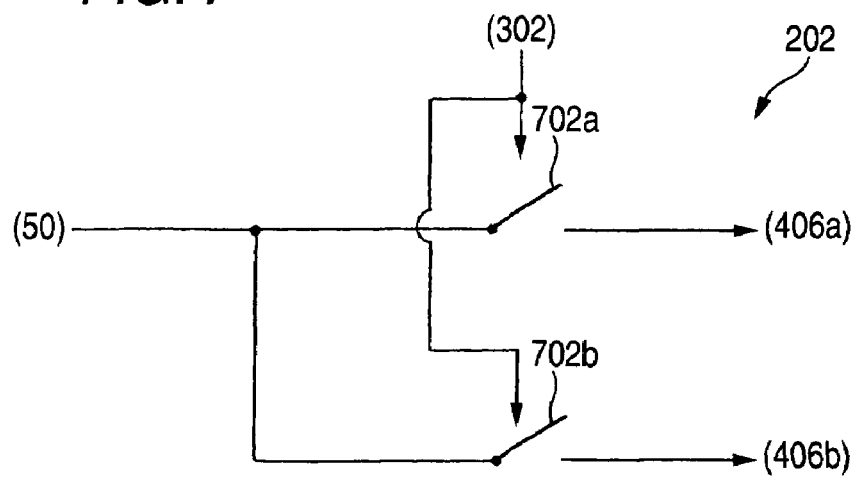
FIG. 7 is a view showing another example of the constitution of a voltage output section 202.

FIG. 7 is a view showing another example of the constitution of the voltage output section 202. In the example, the voltage output section 202 includes a plurality of switches 702a, 702b provided corresponding to the plurality of light source sections 104a, 104b (shown in FIG. 1). Each switch connects the corresponding output side coil 406 with the reference voltage power supply 50 according to a command given from the switch control section 302. In this case, the switch control section 302 synchronously and simultaneously turns on and off the plurality of switches 702a, 702b. The output side coil 406 receives a rectangular wave corresponding to the switch control section 302 from the corresponding switch 702. In the example, a ratio of the electric currents flowing in the plurality of output side coils 406a, 406b can be properly set by the plurality of output side coils 406a, 406b.

Figure 8:
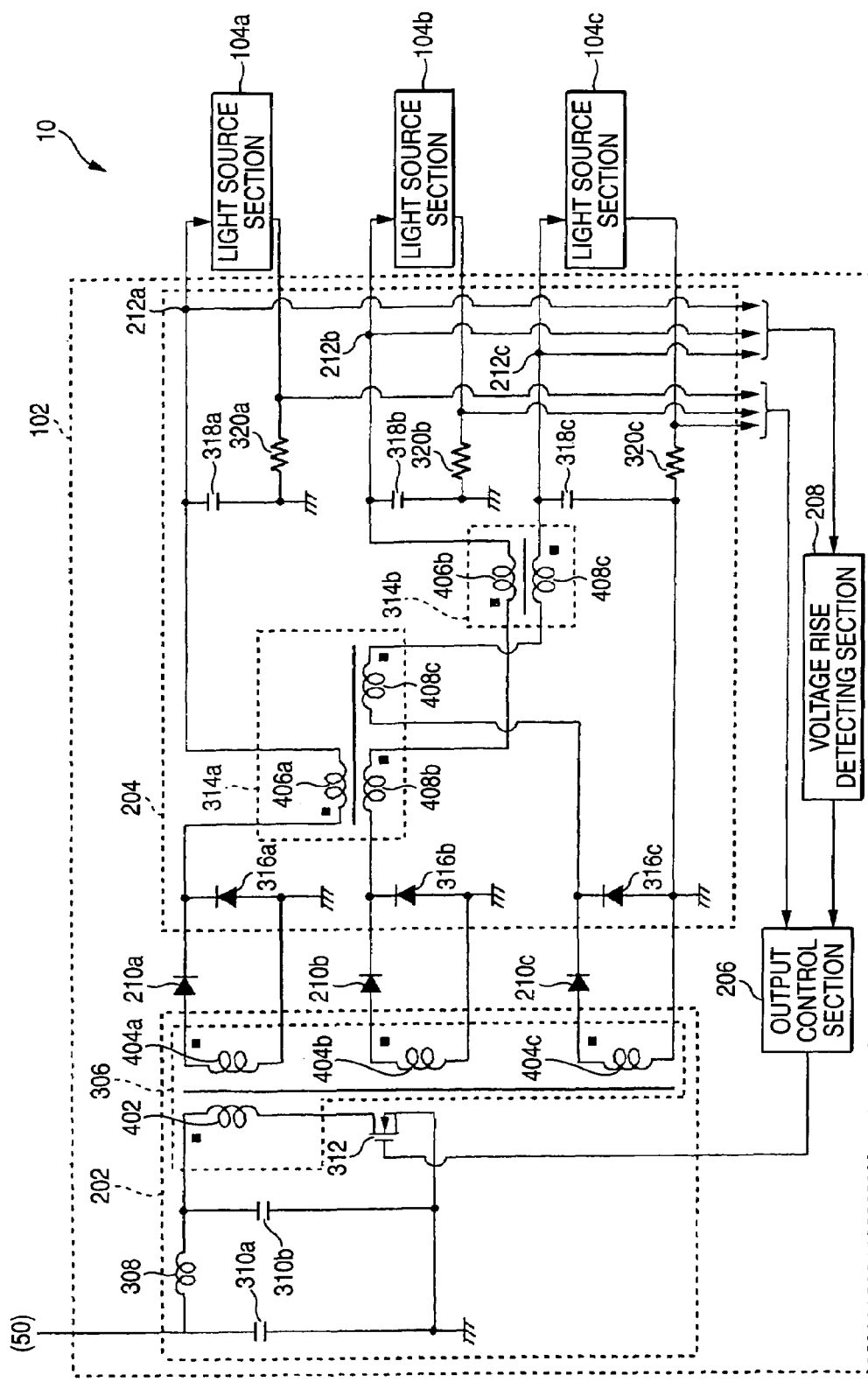
FIG. 8 is a view showing the constitution of the lighting device 10 for the vehicle according to another exemplary, non-limiting embodiment of the present invention.

FIG. 8 is a view showing the constitution of the lighting device 10 for the vehicle according to another exemplary, non-limiting embodiment of the present invention. Except for the points explained as follows, like reference characters are used to indicate like parts in FIGS. 1 and 8. Therefore, the explanations of the like parts in FIG. 8 are omitted here. In the embodiment, the lighting device 10 for the vehicle includes a plurality of light source sections 104a, 104b, 104c. The transformer 306 for the power supply unit includes a plurality of secondary coils 404a, 404b, 404c corresponding to the plurality of light source sections 104a, 104b, 104c.

The electric current ratio setting section 204 includes a plurality of output side transformers 314a, 314b, the number of which is smaller than that of the light source sections 104 by one. The output side transformer 314a includes a plurality of output side coils 406, 408b, 408c. The output side transformer 314b includes a plurality of output side coils 406b, 408c. The output side coil 406a is provided corresponding to the light source section 104a and connected in series to the light source section 104a. The plurality of output side coils 406b, 408b are provided corresponding to the light source section 104b and connected in series to the light source section 104b. The plurality of output side coils 408c are provided corresponding to the light source section 104c and connected in series to the light source section 104c.

The output transformers 314a, 314b will be explained in more detail as follows. In the output side transformer 314a, the output side coils 408b, 408c are wound in the opposite direction to the output side coil 406a. The plurality of output side coils 408b, 408c are wound in the same direction. Therefore, the output side coil 406a and the output side coils 408b, 408c generate magnetic fluxes in the directions so that the magnetic fluxes cancel each other according to the electric current supplied by each voltage output section 202 to each light source section 104. In this case, the output side coil 406a is determined to be a ratio of the electric current flowing in the light source section 104a to the sum of the electric current flowing in the light source section 104b and the electric current flowing in the light source section 104c. Thus, the output side transformer 314a determines a ratio of the electric current flowing in the light source section 104a in the total electric current outputted from the transformer 306 for the power supply unit.

For example, the expression $I_o1=(N_o2 \cdot I_o2+N_o3 \cdot I_o3)/N_o1$ is established where the electric currents flowing in the light source sections 104a, 104b, 104c are respectively $I_o1$, $I_o2$, $I_o3$ in the case where the numbers of turns of the output side coils 406a, 408b, 408c are respectively $N_o1$, $N_o2$, $N_o3$. A ratio of $I_o2$ to $I_o3$ is determined by the output side transformer 314b.

In the output side transformer 314b, the output side coil 406b and the output side coil 408c are wound in the opposite direction to each other. Therefore, the output side coil 406b and the output side coil 408c generate magnetic fluxes in the directions, which cancel each other, according to the electric current supplied to each light source section 104 from the voltage output section 202. Therefore, the output side transformer 314b determines a ratio of the electric current flowing in the light source section 104b to the electric current flowing in the light source section 104c. Thus, the output side transformer 314b determines a ratio of the electric current supplied to the light source section 104b to the electric current supplied to the light source section 104c in the electric current which is obtained when the electric current flowing in the light source section 104a is subtracted from the total electric current outputted from the transformer 306 for the power supply unit. Therefore, according to the embodiment, even in the case where the lighting device 10 for the vehicle has three or more the light source sections 104, the electric current flowing in each light source section 104 can be properly set.

Alternatively, the lighting device 10 for the vehicle may include the first to N-th light source sections 104, the number of which is N (In this case, N is an integer not less than 2, that is, N is one of 2, 3, . . . ). In this case, the voltage output section 202 supplies a voltage to the light source sections 104, the number of which is N, connected in parallel to each other. The power supply unit 102 is provided with the first to the (N−1)-th output side transformers 314, the number of which is (N−1), between the voltage output section 202 and the light source sections 104.

The k-th output side transformer 314 (In this case, k is an integer satisfying the inequality 1≦k≦N−1.) includes: the output side coil 406 connected in series to the k-th light source section 104; and the output side coils 408, the number of which is (N−k). The output side coils 408, the number of which is (N−k), are respectively connected in series to the (k+1)-th to the N-th light source sections 104. These output side coils 408 generate the magnetic fluxes in the directions so that the magnetic fluxes generated by the output side coils 406 connected in series to the k-th light source section 1-04 can be canceled. Thus, a ratio of the electric currents flowing in the light source sections 104, the number of which is N, can be properly set.

Figure 9:
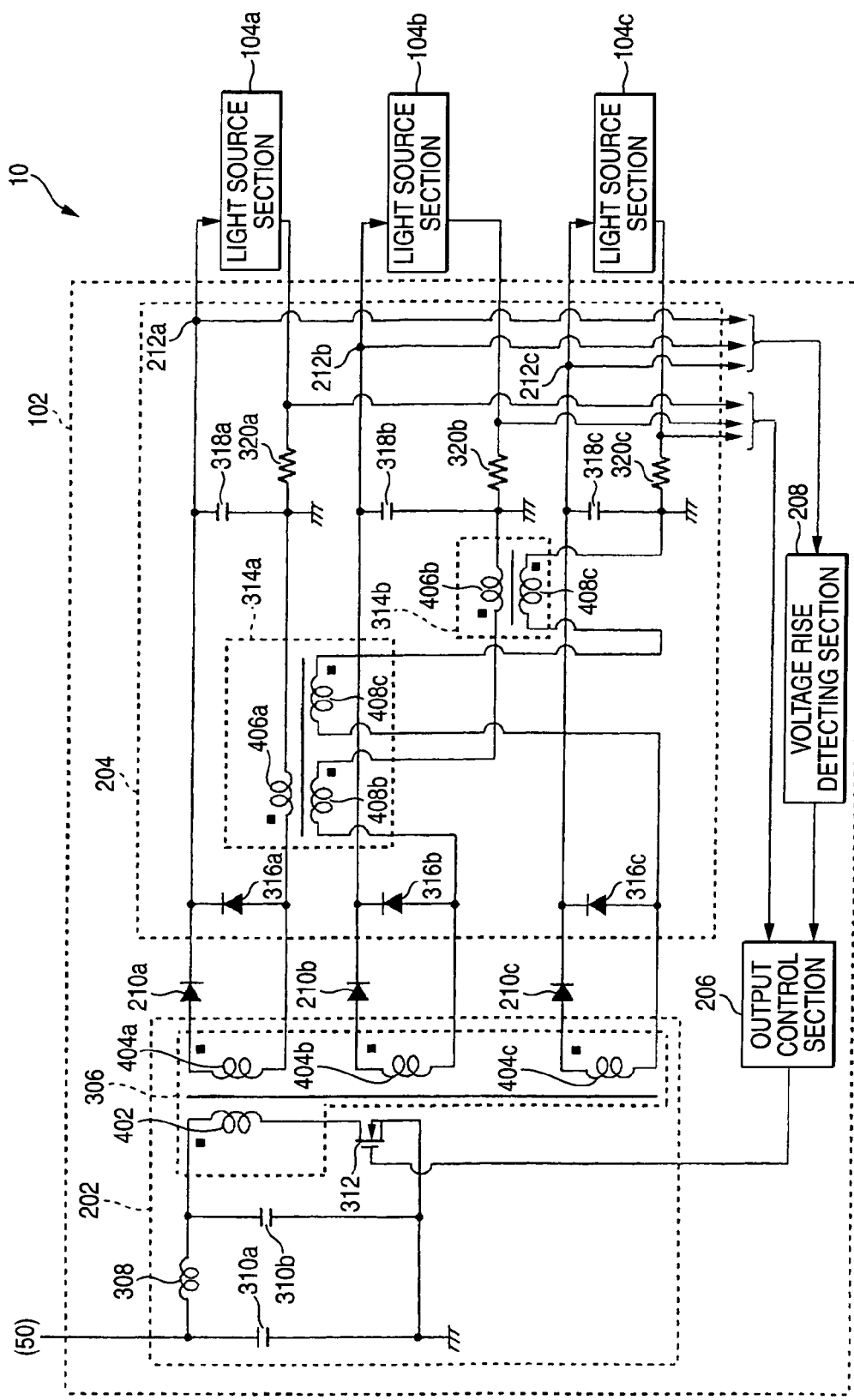
FIG. 9 is a view showing the constitution of the lighting device 10 for the vehicle according to a still another exemplary, non-limiting embodiment of the present invention.

FIG. 9 is a view showing the constitution of the lighting device 10 for the vehicle according to a still another exemplary, non-limiting embodiment of the present invention. Except for the points explained as follows, like reference characters are used to indicate like parts in FIGS. 1, 8 and 9. Therefore, the explanations of the like parts in FIG. 9 are omitted here. In the embodiment, the output side coils 406, 408 are arranged on the downstream side of the corresponding light source section 104. In this case, the output side coil 406 is arranged, for example, in the downstream of the corresponding series resistor 320. In this case, for example, a downstream end of the series resistor 320 is connected to the ground. In this case, a ratio of the electric currents flowing in the plurality of light source sections 104 can be properly set.

Alternatively, for example, the cathode of the output current supplying section 210 may be grounded. In this case, the transformer 306 for the power supply unit outputs a negative voltage from the low potential side output of the secondary coil 404. In this case, a ratio of the electric currents flowing in the plurality of light source sections 104 can be properly set.

The present invention has been explained above referring to the embodiments. However, it should be noted that the present invention is not limited to the above specific embodiments. Variations may be made by those skilled in the art. It is clear that the varied or improved embodiments are included in the technical scope of the present invention.

What is claimed is:

1. A power supply unit for a lighting device in a vehicle comprising:
    a voltage output section for supplying a voltage to a plurality of loads within the lighting device in the vehicle, wherein the plurality of loads are connected in parallel with each other;
    a plurality of output side coils provided respectively corresponding to the plurality of loads, the plurality of output side coils being trans-connected with each other, the plurality of output side coils being connected with the corresponding loads in series, wherein an electric current to be supplied from the voltage output section to the corresponding load flows in each output side coil;
    a voltage rise detecting section for detecting that a rise in voltage at a node between the load and the output side coil corresponding to the load becomes higher than a predetermined value; and
    an output control section for selectively stopping an output of voltage from the voltage output section with respect to a load, the rise of the node voltage of which is detected, in the case where the rise in the node voltage of the load is detected by the voltage rise detecting section.

2. The power supply unit according to claim 1, wherein the output side coils generate magnetic fluxes, the directions of which are canceled to each other, according to the electric currents respectively supplied to the loads from the voltage output section.

3. The power supply unit according to claim 1, wherein the voltage output section has a transformer for the power supply unit including a primary coil and a plurality of secondary coils provided corresponding to the plurality of loads, and
    the plurality of secondary coils are respectively connected with the corresponding loads and the output side coils corresponding to the loads in series.

4. The power supply unit according to claim 1, further comprising:
    a plurality of series resistors respectively arranged corresponding to the loads and respectively connected with the corresponding loads and also connected with the output side coils corresponding to the loads in series; and
    an output control section for controlling an output voltage of the voltage output section so that voltages generated at both ends of the respective series resistors can be equal to a setting voltage commonly determined for the plurality of series resistors.

5. The power supply unit according to claim 1, wherein the plurality of output side coils are formed so that the winding wire can be separate from each other.

6. The power supply unit according to claim 1, further comprising:
    a semiconductor element for supplying an electric current according to a leakage inductance of the output side coil to the load in the case where an electric current supplied from the voltage output section to the load is reduced.

7. The power supply unit according to claim 1, wherein the voltage output section supplies voltage to N pieces of loads (N is an integer not less than 2) from the first to the N-th which are connected in parallel with each other, and
    the power supply unit includes (N−1) pieces of output side transformers from the first to the (N−1)-th provided between the voltage output section and the load and
    the k-th output side transformer (k is an integer satisfying the equality 1≦k≦N−1) includes the output side coil connected with the k-th load in series and also includes (N−k) pieces of output side coils respectively connected with the (k+1) to the N-th load in series and generating a magnetic flux in the direction to cancel the magnetic flux generated by the output side coil connected with the k-th load in series according to the electric current supplied from the voltage output section.

8. The power supply unit according to claim 1, wherein the plurality of loads are light sources respectively having a semiconductor light emitting element connected to the corresponding output side coils in series.

9. The lighting device for a vehicle comprising:
    a plurality of light source sections connected in parallel with each other;
    a voltage output section for supplying voltage to the plurality of light source sections; and a plurality of output side coils respectively arranged corresponding to the plurality of light source sections, the plurality of output side coils being a plurality of output side coils trans-connected with each other, the plurality of output side coils being connected with the corresponding light source sections in series, wherein an electric current to be supplied from the voltage output section to the corresponding light source section flow in each output side coil;

a voltage rise detecting section for detecting that a rise in voltage at a node between the load and the output side coil corresponding to the load becomes higher than a predetermined value; and an output control section for selectively stopping the output of voltage from the voltage output section with respect to a load, the rise of the node voltage of which is detected, in the case where the rise in the node voltage of the load is detected by the voltage rise detecting section.

10. The power supply unit according to claim 1, wherein the plurality of loads comprise a plurality of light source sections.

11. The power supply unit according to claim 10, wherein the output control section maintains an output of voltage from the voltage output section to a predetermined number of the plurality of light source sections so as to maintain a predetermined amount of light emitted from the plurality of light source sections.

12. The power supply unit according to claim 1, wherein the output control section selectively starts an output of voltage from the voltage output section, when an output of voltage is stopped from the voltage output section with respect to a load, to another load.

13. The lighting device according to claim 9, wherein the output control section maintains an output of voltage from the voltage output section to a predetermined number of the plurality of light source sections so as to maintain a predetermined amount of light emitted from the plurality of light source sections.

14. The lighting device according to claim 9, wherein the output control section selectively starts an output of voltage from the voltage output section, when an output of voltage is stopped from the voltage output section with respect to a load, to another load.

15. A lighting device for a vehicle comprising:
a plurality of light source sections connected in parallel with each other;
a voltage output section for supplying voltage to the plurality of light source sections;
a plurality of output side coils respectively arranged corresponding to the plurality of light source sections, the plurality of output side coils being a plurality of output side coils trans-connected with each other, the plurality of output side coils being connected with the corresponding light source sections in series; and
a semiconductor element for supplying an electric current according to a leakage inductance of the output side coil to the light source section in the case where an electric current supplied from the voltage output section to the light source section is reduced,
wherein an electric current to be supplied from the voltage output section to the corresponding light source section flows in each output side coil;
wherein the output side coils generate magnetic fluxes, the directions of which are canceled to each other, according to the electric currents respectively supplied to the light source sections from the voltage output section; and
wherein the plurality of light source sections are light sources respectively having a semiconductor light emitting element connected to the corresponding output side coils in series.

16. The lighting device for a vehicle according to claim 15, further comprising:
a voltage rise detecting section for detecting that a rise in voltage at a node between the light source section and the output side coil corresponding to the light source section becomes higher than a predetermined value; and
an output control section for stopping an output of voltage from the voltage output section with respect to a light source section, at least the rise of the node voltage of which is detected, in the case where the rise in the node voltage of the light source section is detected by the voltage rise detecting section.

17. The lighting device for a vehicle according to claim 15,
wherein the voltage output section has a transformer for the power supply unit including a primary coil and a plurality of secondary coils provided corresponding to the plurality of light source sections, and
the plurality of secondary coils are respectively connected with the corresponding light source sections and the output side coils corresponding to the light source sections in series.

18. The lighting device for a vehicle according to claim 15, further comprising:
a plurality of series resistors respectively arranged corresponding to the light source sections and respectively connected with the corresponding light source sections and also connected with the output side coils corresponding to the light source sections in series; and
an output control section for controlling an output voltage of the voltage output section so that voltages generated at both ends of the respective series resistors can be equal to a setting voltage commonly determined for the plurality of series resistors.

19. The lighting device for a vehicle according to claim 15,
wherein the voltage output section supplies voltage to N pieces of light source sections (N is an integer not less than 3) from the first to the N-th which are connected in parallel with each other, and
the power supply unit includes (N−1) pieces of output side transformers from the first to the (N−1)-th provided between the voltage output section and the light source section, and
the k-th output side transformer (k is an integer satisfying the equality $1 \leq k \leq N-1$) includes the output side coil connected with the k-th light source section in series and also includes (N−k) pieces of output side coils respectively connected with the (k+1) to the N-th light source section in series and generating a magnetic flux in the direction to cancel the magnetic flux generated by the output side coil connected with the k-th light source section in series according to the electric current supplied from the voltage output section.

* * * * *